US012654338B1

(12) United States Patent
Stodden

(10) Patent No.: US 12,654,338 B1
(45) Date of Patent: Jun. 16, 2026

(54) RETRIEVAL DEVICE WITH LOCKING FEATURE

(71) Applicant: Michael F. Stodden, Rocky Point, NC (US)

(72) Inventor: Michael F. Stodden, Rocky Point, NC (US)

( * ) Notice: Subject to any disclaimer, the term of this patent is extended or adjusted under 35 U.S.C. 154(b) by 0 days.

(21) Appl. No.: 19/337,844

(22) Filed: Sep. 23, 2025

(51) Int. Cl.
| | |
|---|---|
| *B66C 1/44* | (2006.01) |
| *B25J 15/08* | (2006.01) |
| *B25J 19/02* | (2006.01) |
| *E21B 31/18* | (2006.01) |
| *E21B 47/002* | (2012.01) |

(52) U.S. Cl.
CPC ........... *B25J 15/083* (2013.01); *B25J 19/023* (2013.01); *B66C 1/44* (2013.01); *E21B 31/18* (2013.01); *E21B 47/002* (2020.05)

(58) Field of Classification Search
CPC ...... E21B 31/18; E21B 47/002; B25J 19/023; B25J 19/083; B66C 1/44
USPC .................................. 294/86.27, 86.28, 210
See application file for complete search history.

(56) References Cited

U.S. PATENT DOCUMENTS

| | | | | | |
|---|---|---|---|---|---|
| 1,051,992 | A | * | 2/1913 | Fisher et al. ............ | E03C 1/302 |
| | | | | | 294/111 |
| 2,429,884 | A | * | 10/1947 | Leigh ....................... | H01K 3/32 |
| | | | | | 81/53.11 |
| 3,266,059 | A | * | 8/1966 | Stelle ......................... | B25J 9/06 |
| | | | | | 138/131 |

| | | | | | |
|---|---|---|---|---|---|
| 3,360,292 | A | * | 12/1967 | Trammell .............. | A01K 97/24 |
| | | | | | D8/4 |
| 4,130,314 | A | * | 12/1978 | Storm ....................... | A21C 9/08 |
| | | | | | 294/100 |
| 4,231,603 | A | * | 11/1980 | van Zelm ................. | A61F 4/00 |
| | | | | | 294/111 |
| 4,253,697 | A | * | 3/1981 | Acosta ........................ | B25J 1/02 |
| | | | | | 294/111 |
| 4,483,562 | A | * | 11/1984 | Schoolman ............ | A61B 17/29 |
| | | | | | 606/174 |
| 4,552,039 | A | * | 11/1985 | Fisher ....................... | B25B 9/02 |
| | | | | | 294/100 |
| 4,586,744 | A | * | 5/1986 | Price ....................... | B66C 1/442 |
| | | | | | 294/92 |
| 4,599,074 | A | * | 7/1986 | Beckly ...................... | B63C 9/26 |
| | | | | | 114/221 R |

(Continued)

*Primary Examiner* — Paul T Chin
(74) *Attorney, Agent, or Firm* — My Patent Guys; Christopher Pilling; Colton Bangs

(57) ABSTRACT

A retrieval device with a locking feature is provided for recovering objects from wells, pipes, or similar passages. The device includes an arm tube body, a plurality of arms movable between open and closed positions by a control cable, and a locking mechanism configured to secure the control cable when the arms engage a target object. In one embodiment, the locking mechanism comprises a lock-off tube and a rocker arm pin that pinches a bridge cable to maintain the arms in a closed position, with a release cable enabling remote unlocking. Springs are employed to manage tension and provide safety redundancy. Gripping features on the arms enhance secure capture of target objects, while an optional camera integrated within the arm tube body provides visual guidance during retrieval. The locking mechanism allows objects to be securely held and selectively released without removing the device from the passage, improving efficiency and reliability of retrieval operations.

13 Claims, 17 Drawing Sheets

(56)                    References Cited

U.S. PATENT DOCUMENTS

| | | | | | |
|---|---|---|---|---|---|
| 4,629,234 | A | * | 12/1986 | Sokolowski | B25J 1/04 |
| | | | | | 294/111 |
| 4,995,661 | A | * | 2/1991 | Aurness | E01H 1/1206 |
| | | | | | 294/1.4 |
| 5,317,939 | A | * | 6/1994 | Marinescu | H01K 3/32 |
| | | | | | 81/53.11 |
| 5,494,240 | A | * | 2/1996 | Waugh | B64D 1/22 |
| | | | | | 294/119.2 |
| 5,570,919 | A | * | 11/1996 | Eusebe | B25J 1/04 |
| | | | | | 294/111 |
| 5,611,587 | A | * | 3/1997 | Brown | B66C 3/06 |
| | | | | | 294/111 |
| 5,647,622 | A | * | 7/1997 | Schectman | B25J 1/02 |
| | | | | | 294/111 |
| 6,067,942 | A | * | 5/2000 | Fernandez | A01K 74/00 |
| | | | | | 119/804 |
| 6,106,042 | A | * | 8/2000 | McCloy, Jr. | B66C 1/42 |
| | | | | | 294/100 |
| 6,705,040 | B1 | * | 3/2004 | New | A01K 97/24 |
| | | | | | 43/17.2 |
| 7,448,659 | B1 | * | 11/2008 | Auseklis | E01H 1/1206 |
| | | | | | 294/1.4 |
| D811,835 | S | * | 3/2018 | Katzmann | D8/14 |
| 10,479,464 | B2 | * | 11/2019 | Busch | B63C 9/26 |
| 12,077,416 | B1 | * | 9/2024 | Stodden | B66C 1/44 |

* cited by examiner

201

201

201

203

RETRIEVAL DEVICE WITH LOCKING FEATURE

BACKGROUND OF THE INVENTION

1. Field of the Invention

The present invention relates to retrieval devices, but more specifically retrieval devices for deep wells and plumbing pipes.

2. Description of Related Art

Occasionally, items need to be recovered from deep wells, plumbing pipes, or similar tubes. Currently, grappling hooks and magnet type devices are some of the common retrieval tool types being used today. Often the situation, depth, clearance, well diameter, and other factors prevent or necessitate the use of one or more types of retrieval tools. Sometimes, camera systems are used to locate the lost or broken item within the well.

Known retrieval devices include: Aulenbacher, Merle W. "Method and apparatus for cutting and retrieving casing from a well bore." U.S. Pat. No. 4,047,568, issued Sep. 13, 1977; Axelstrom, Raymond E., "Well rod grab." U.S. Pat. No. 2,590,487, issued Mar. 25, 1952; Burkepile, Ivan H., Burkepile, Jimmie J., "Well pipe retrieving device." U.S. Pat. No. 3,902,751, issued Sep. 2, 1975; Carver, Herman C., Michael R. Kent, and Bernie L. Chalmers. "Retrieval tool." U.S. Pat. No. 4,580,826, issued Apr. 8, 1986; Griffin, Claud Champ. "Pipe-grip." U.S. Pat. No. 827,011, issued Jul. 24, 1906; Hoffman, Corey E., Richard Lee Giroux, Mike A. Luke, and Stephen J. Norris. "Sand removal and device retrieval tool." U.S. Pat. No. 6,427,776, issued Aug. 6, 2002; Lyons, John E., "Pipe grab." U.S. Pat. No. 1,781,335, issued Nov. 11, 1930; Morris, George H O, and Robert F. Mitchell. "Apparatus for retrieving pipe sections from a well bore." U.S. Pat. No. 4,969,514, issued Nov. 13, 1990; Newman, Kenneth R. "Deployment/retrieval method and apparatus for well tools used with coiled tubing." U.S. Pat. No. 4,940,095, issued Jul. 10, 1990; and, Robichaux, Sosthene. "Method of removing stuck pipe from wells." U.S. Pat. No. 2,261,564, issued Nov. 4, 1941.

Most recently U.S. Pat. No. 12,077,416 B1, issued Sep. 3, 2024, which is incorporated herein at least by reference, teaches a "Retrieval Device". The limitation to this retrieval device is that the jaws are unable to be locked in place and then subsequently unlocked, which makes retrieval of an object more difficult. Consequently, a solution is needed.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a retrieval device with locking feature.

Figure 1:
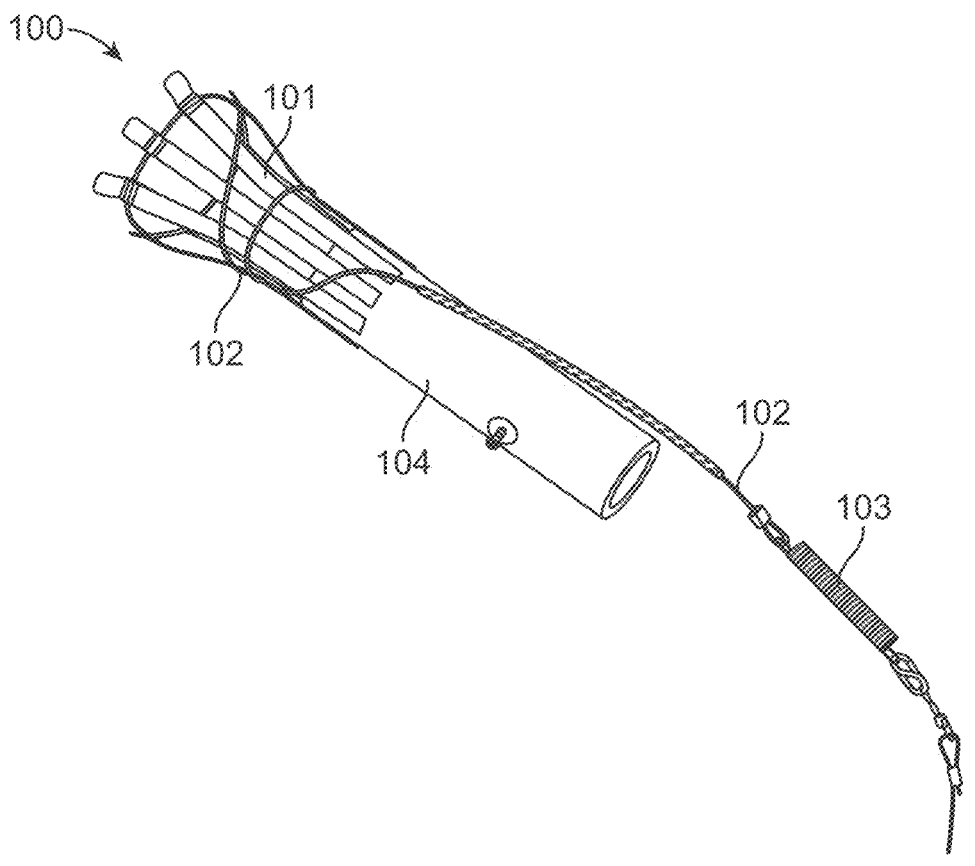
FIG. 1 is a perspective view of a retrieval device according to an embodiment of the present invention.
Figure 2:
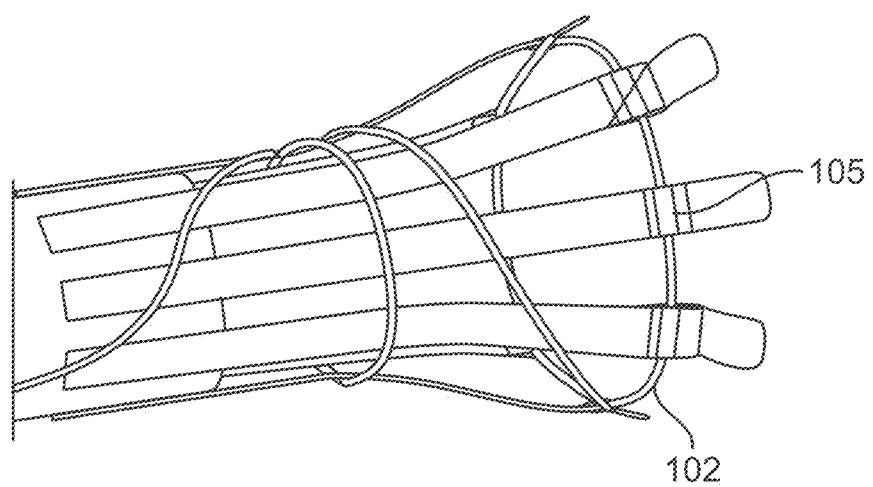
FIG. 2 is a detailed view of FIG. 1.
Figure 3:
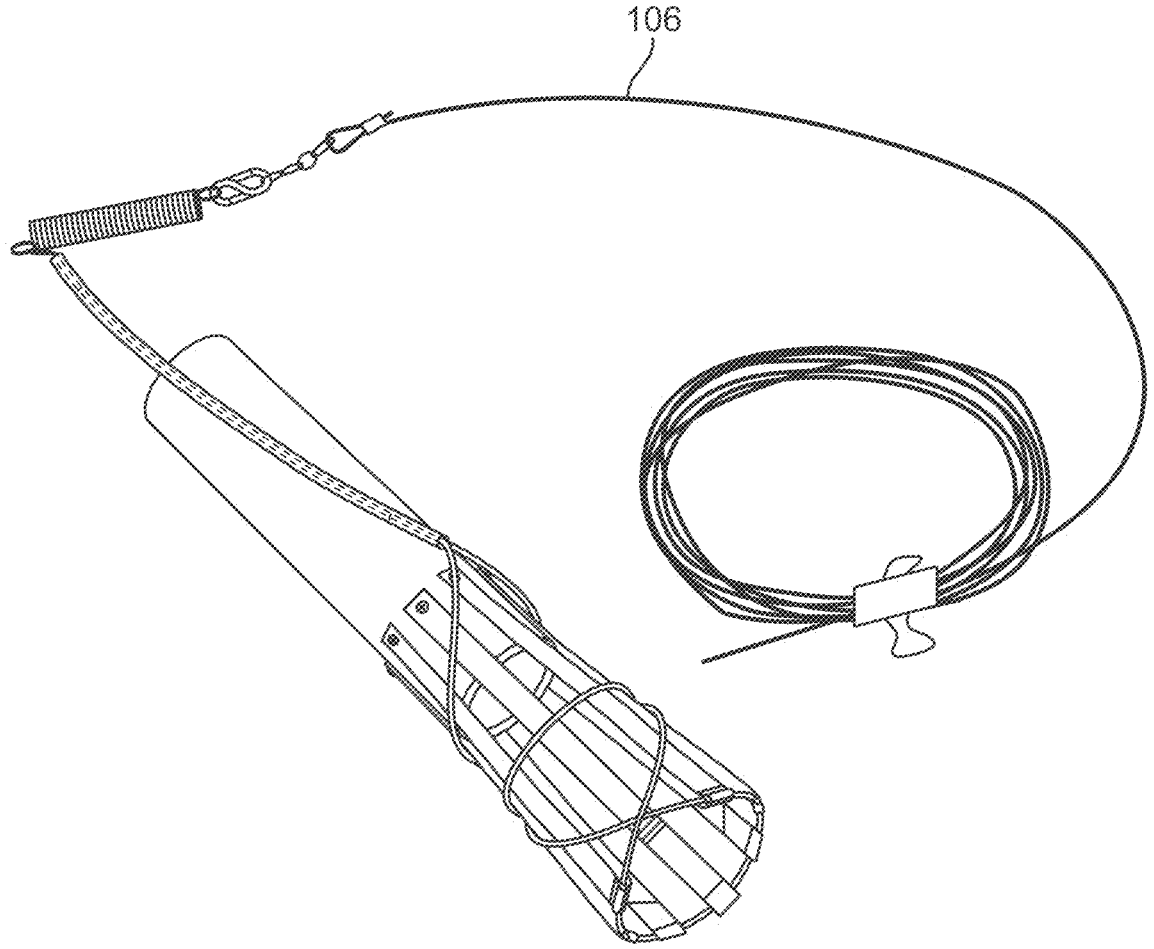
FIG. 3 is a front perspective view of the retrieval device according to an embodiment of the present invention.
Figure 4:
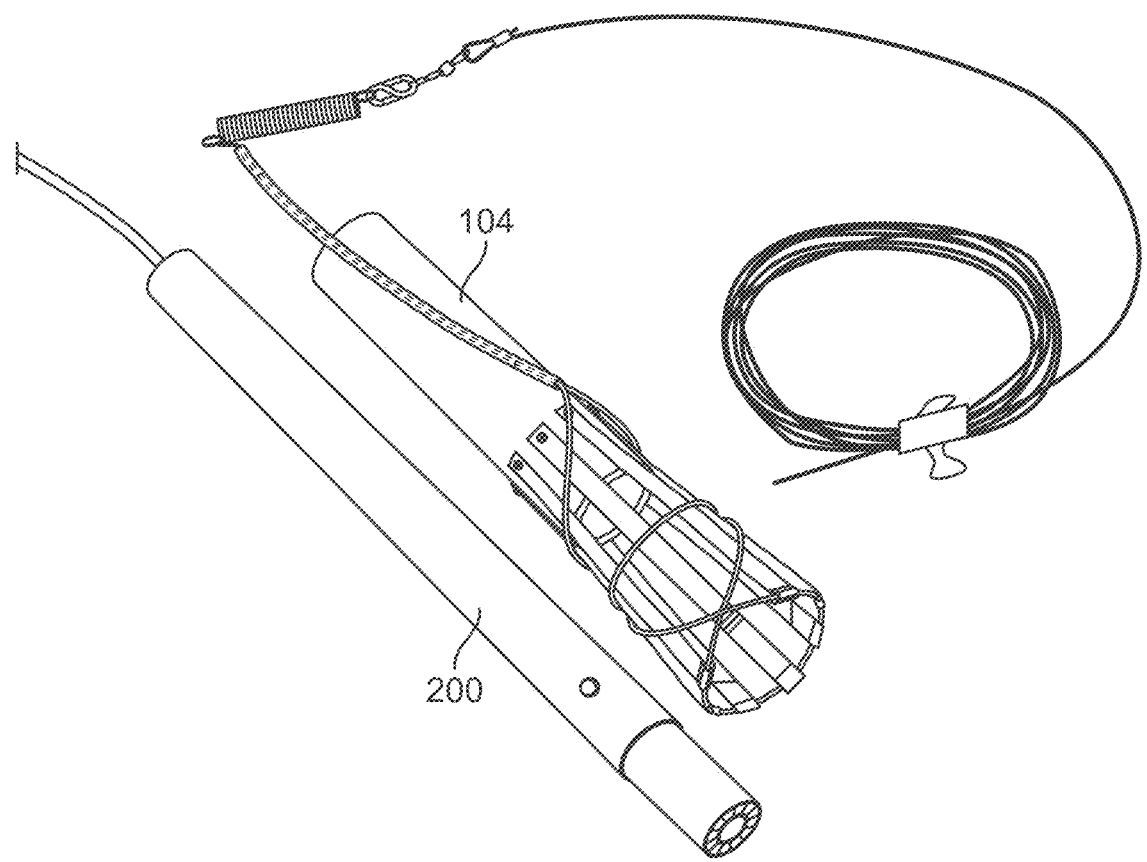
FIG. 4 is a perspective view of a retrieval device and a camera device according to an embodiment of the present invention.
Figure 5:
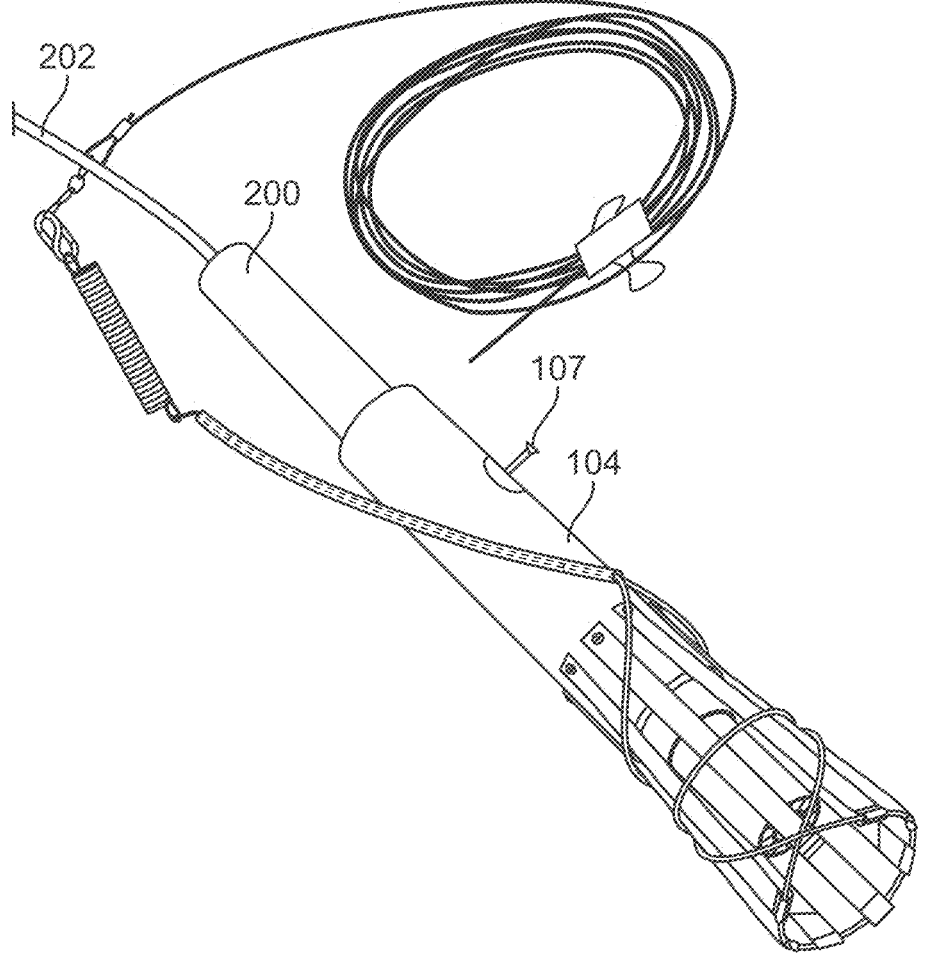
FIG. 5 is a perspective view of the retrieval device with the camera device attached within the arm tube body of the retrieval device according to an embodiment of the present invention.

FIGS. 1-8 are various views of the prior art retrieval device, which does not comprise the locking feature. Referring to FIGS. 1-3, in some embodiments, retrieval device 100 comprises a plurality of arms 101, a control cable 102, a resilient connecting device 103, and an arm tube body 104. During use, the control cable 102 is configured to engage the plurality of arms 101 enabling each arm to move from an open to closed position to enable an item (not shown) to be captured, caught, or grabbed between the closed "jaws" of the plurality of arms. The details and operation of the control cable will be discussed in greater detail below.

Figure 6A:
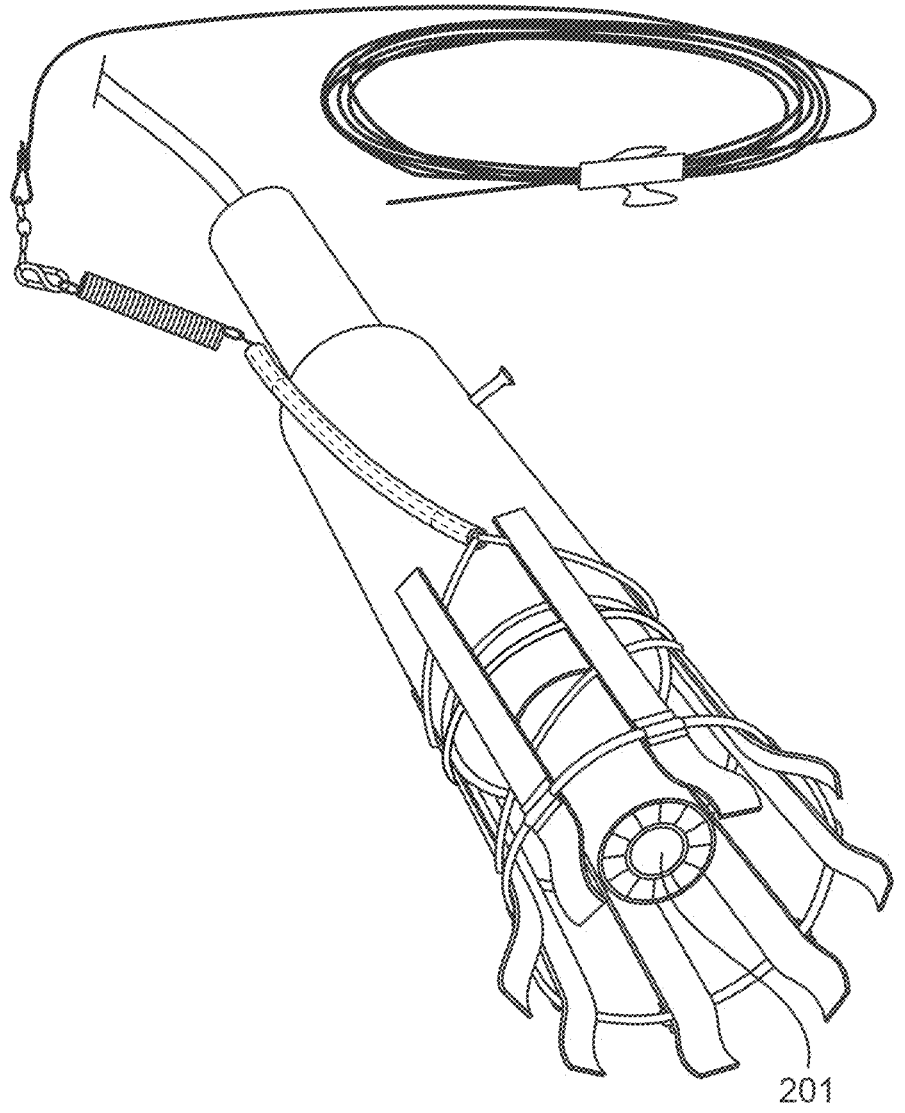
FIG. 6A-C are detailed views of the retrieval device showing the camera lens of the camera device and various gripping features according to an embodiment of the present invention.
Figure 6B:
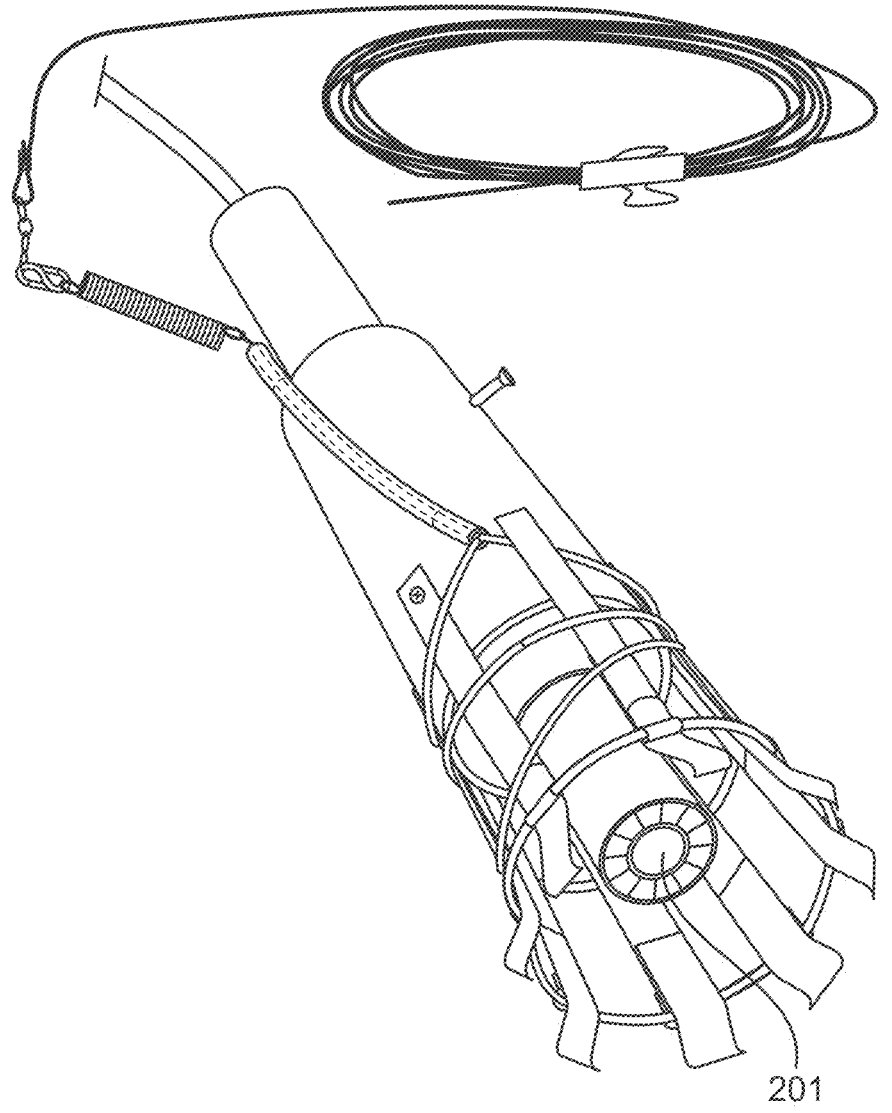
Figure 6C:
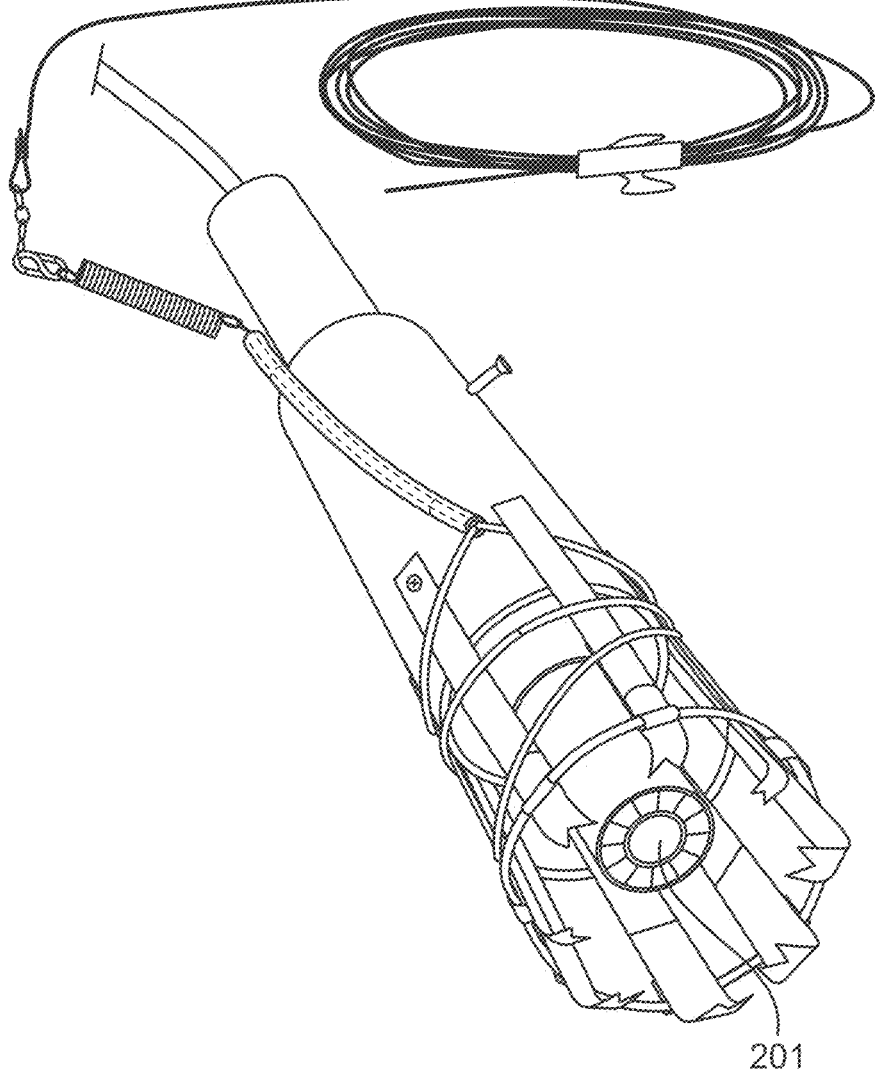
Figure 6D:
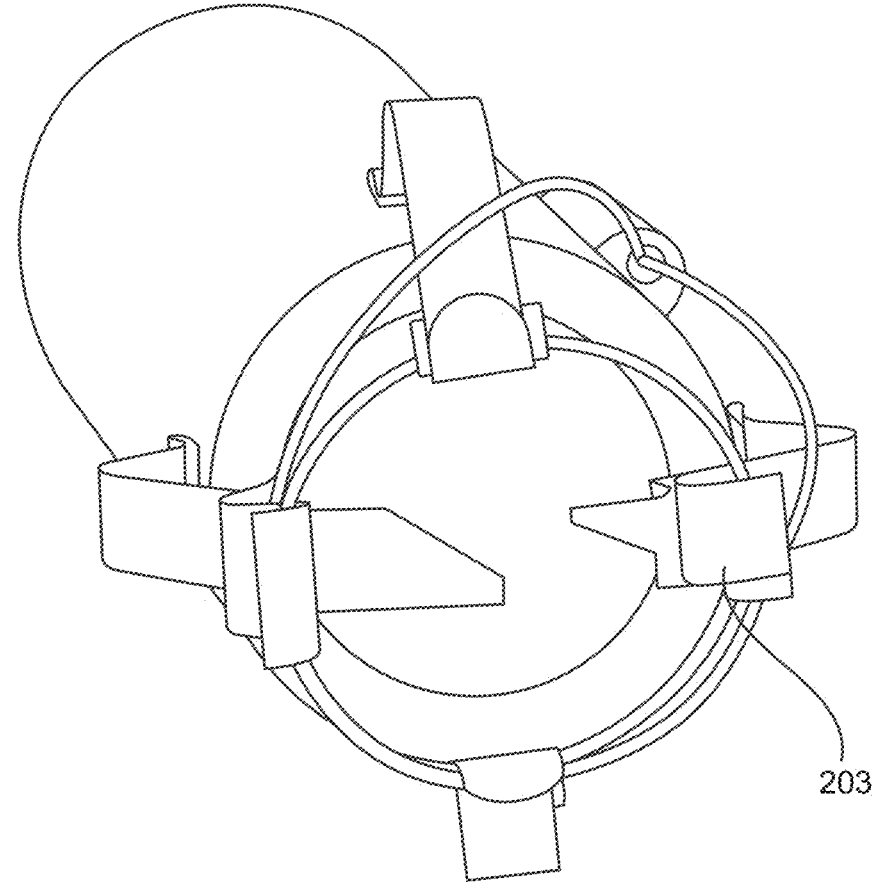
FIGS. 6D-E are detailed views of the retrieval device with alternative gripping features according to an embodiment of the present invention.
Figure 6E:
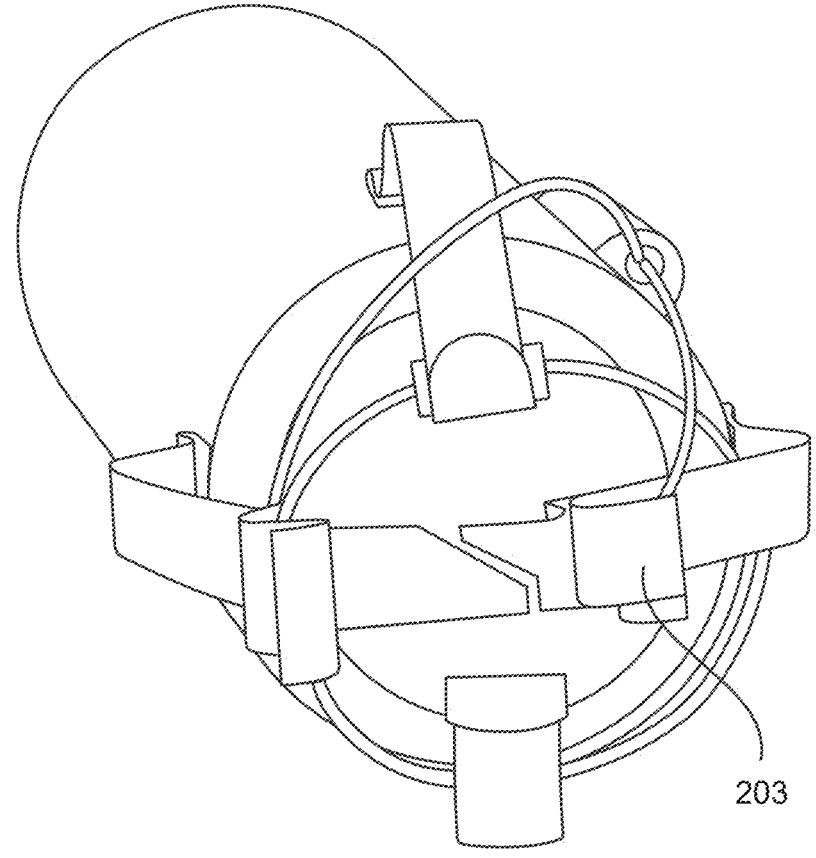

In one embodiment, each arm of the plurality of arms is attached to a distal end of the arm tube body 104. In some embodiments, each arm includes gripping features 203 designed to assist in catching, gripping, or grabbing the intended item to be retrieved. In some embodiments, the gripping features may be positioned at an end portion of each arm and/or be positioned at an interior portion towards the distal end of each arm. The gripping features may include, but are not limited to, barbs, flared ends, flanged sections, protrusions, textures, magnets or similar elements. The intended item may be any item or object desired for retrieval, including but not limited to washers, screws, tools, drill bits, broken objects, phones, and includes both metallic and non-metallic items. Best seen in FIGS. 6A-E, a plurality of gripping features 203 are shown. In FIGS. 6D-E, a four arm closure system is shown enabling a full closure gripping feature 203 intended for picking up small items.

In one embodiment, the control cable 102 has a first end and a second end, wherein the first end is anchored to the arm tube body 104, and the second end is configured to close, via a pulling motion from a user, the plurality of arms 101. In some embodiments, a portion of the control cable 102 is wrapped around the plurality of arms 101. In some embodiments, the control cable 102 is wrapped in a criss-cross formation, which helps maximize the closing of the plurality of arms 101 with minimal pulling effort from the user. In some embodiments, a channel 105 is provided approximate to the distal end on each arm, wherein the channels are configured to receive the control cable 102 aiding in closing or pulling the plurality of arms 101 together to grab the intended item. As the retrieval depth may vary, and in some cases the depth may be over 500 feet, the control cable length is generally fixed, and the second end is attached to the resilient connecting device 103, which is configured to be attached to an additional cable 106 at a suitable length for the retrieval depth.

In some embodiments, the arms 101 are made of pre-shaped spring steel. This is advantageous because the arms 101 are able to hold their tension in the closed position and will automatically return to their normal open position when the force from the control cable 102 on the arms 101 is released. Hence, no additional force is required to return the arms 101 to an open position. This feature allows the arms 101 to repeatedly return to their open position once the tension supplied by the control cable 102 on the arms 101 is released.

Best seen in FIGS. 4-6C, in some embodiments, a camera 200 is provided to improve the user's ability to see the intended item to be retrieved and to navigate the depth of the well. As the arm tube body 104 is constructed as a hollow cylinder, the camera 200 is configured to be placed within the hollow cylinder of the arm tube body 104, such that the camera lens (201; FIG. 6A) is extended towards the end of the retrieval device 100 as illustrated. In one embodiment, a set screw 107 is used to secure the camera 200 within the arm tube body 104. As shown, the camera 200 is connected to a camera cable 202, wherein the camera cable 202 is configured to be used with the control cable 102 to retrieve the intended item by pulling it back to the surface and out of the well or pipe. More specifically, the camera cable 202 is used for resistance, while the control cable 102 (via the additional cable 106) is pulled to close the plurality of arms 101 around the item.

Figure 7:
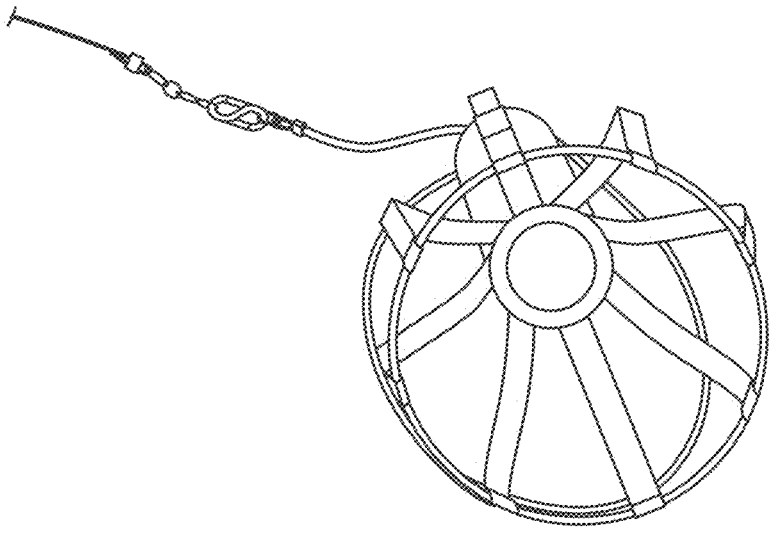
FIG. 7 is a bottom perspective view of the retrieval device in an open position according to an embodiment of the present invention.
Figure 8:
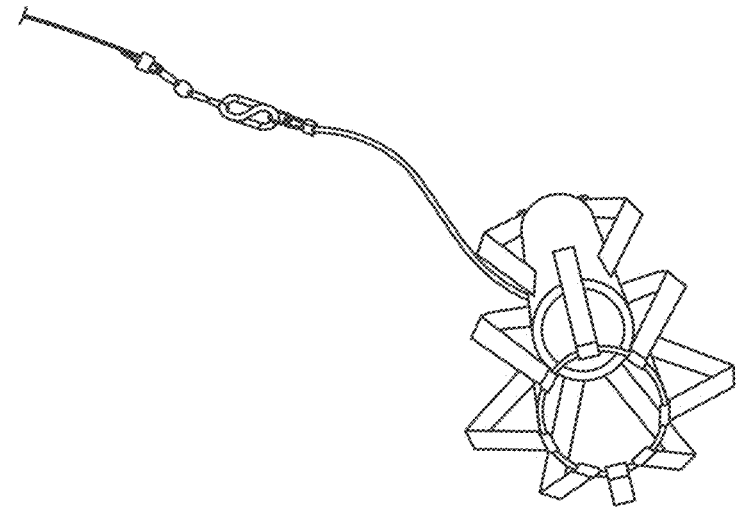
FIG. 8 is a bottom perspective view of the retrieval device in a closed position according to an embodiment of the present invention.

FIGS. 7 and 8 show one embodiment of the retrieval device in an open and closed position respectively. As previously described, a user manipulates and closes the plurality of arms by pulling the control cable. When the control cable is retracted, the plurality of arms open back to their starting position.

Figure 9:
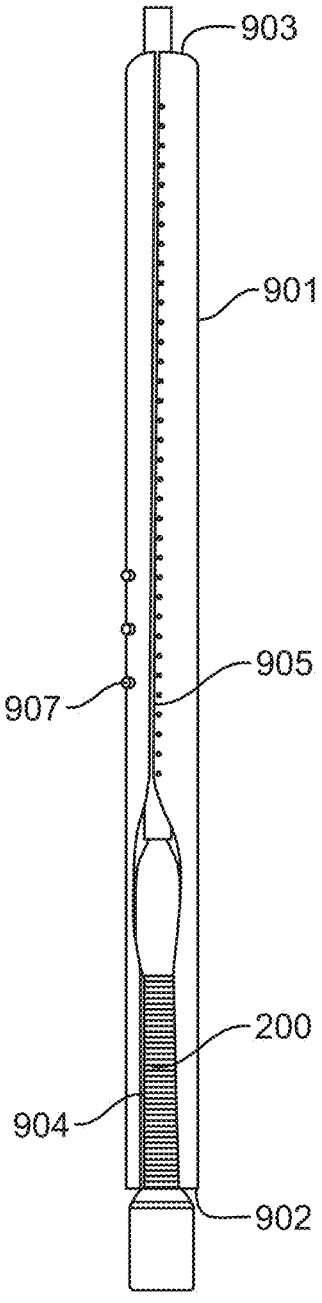
FIG. 9 is a side view of a lock off tube with an attached camera according to an embodiment of the present invention.
Figure 13:
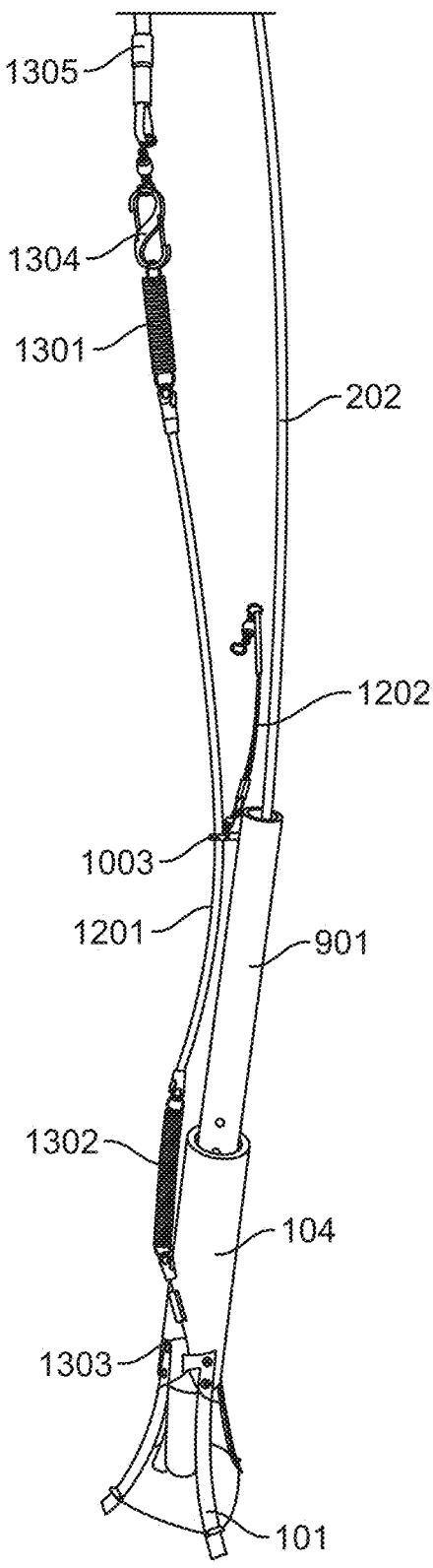
FIG. 13 is a side perspective view of the retrieval device with locking feature according to an embodiment of the present invention.
Figure 15:
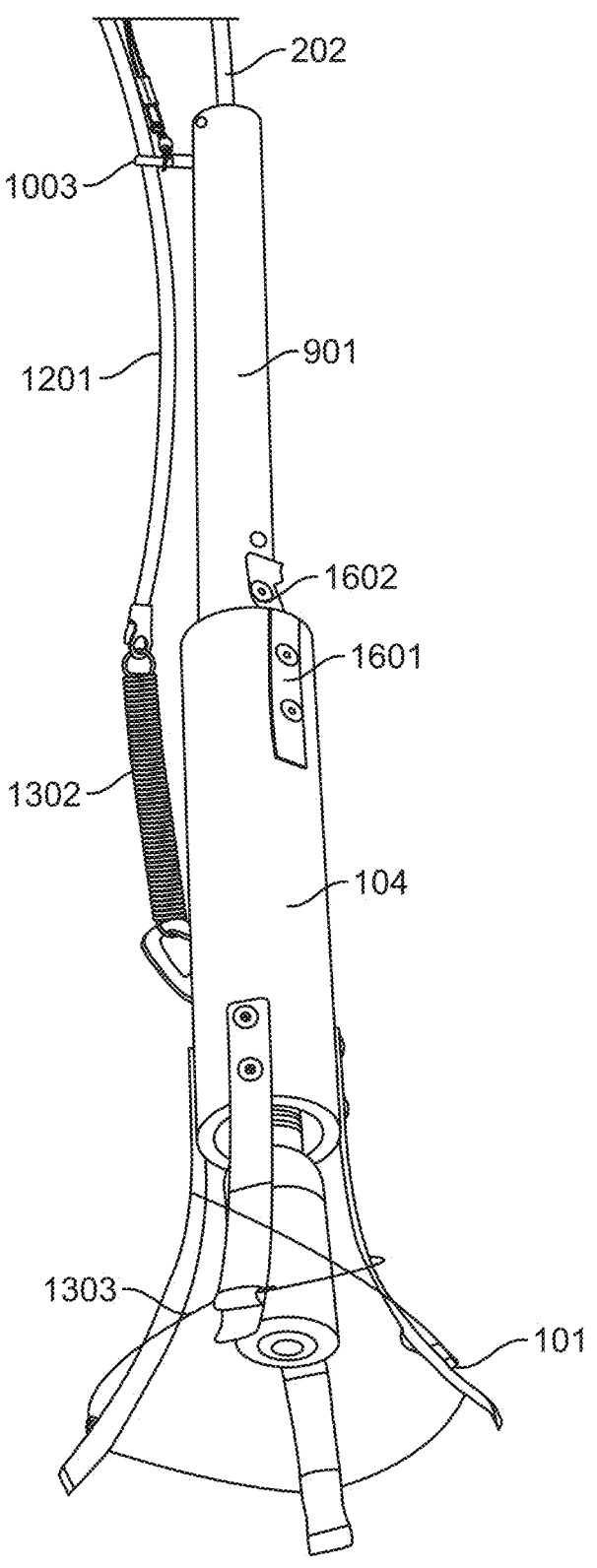
FIG. 15 is a rotated side perspective view of the retrieval device with locking feature according to an embodiment of the present invention.

Now, beginning with FIG. 9 the current invention with the added improvement of a locking feature can be seen. FIG. 9 shows a lock off tube 901, which fits inside of the arm tube body 104 of the retrieval device (as seen in FIG. 13). In some embodiments, the lock off tube 901 has one or more set screws 907 protruding from the side wall of the tube which are used to removably connect the lock off tube 901 to the body 104. In some embodiments, seen in FIG. 15, an anchor strap 1601 with one or more anchor strap holes 1602 is attached to the outside of the arm tube body 104 by rivets. In some embodiments, the anchor strap 1601 removably attaches to a set screw 907 with an anchor strap hole 1602 sliding onto the set screw 907. In one embodiment, the anchor strap 1601 is made of spring steel so that it can stretch and return to its original form. In one embodiment, the anchor strap 1601 has a protruding tab (not shown) that can be used by a user to manipulate the anchor strap 1601. The tab on the anchor strap 1601 allows the user to stretch the spring steel of the anchor strap 1601 up and over a set screw 907 for rapidly and securely connecting and disconnecting the arm tube body 104 and the lock off tube 901. This has the advantage of allowing one to quickly replace the arm tube body 104 with one that has more appropriate arms 101 for the job at hand. In one embodiment, the set screw 907 has a head with a flat underside which securely keeps the anchor strap 1601 on the set screw 907. The combination of the flat underside of the head of the set screw 907 and the spring steel of the anchor strap 1601 pulling the anchor strap 1601 down into the set screw 907, ensure the arm tube body 104 and the lock off tube 901 remain attached under jarring forces experienced by the apparatus when operating down in a well, pipe, or other environment.

The lock off tube 901 has a first end 902 and an opposite second end 903. In some embodiments, the first end 902 is oriented towards the plurality of arms and has a tube clasp 904 configured to hold a camera 200 in place when the camera 200 is pressed fully into the tube clasp 904. In some embodiments, the lock off tube 901 has a slit 905 running along the long axis of the tube. In some embodiments, the slit 905 is wider at the first end 902 of the lock off tube to accommodate the insertion of the camera 200 into the tube clasp 904.

Figure 10:
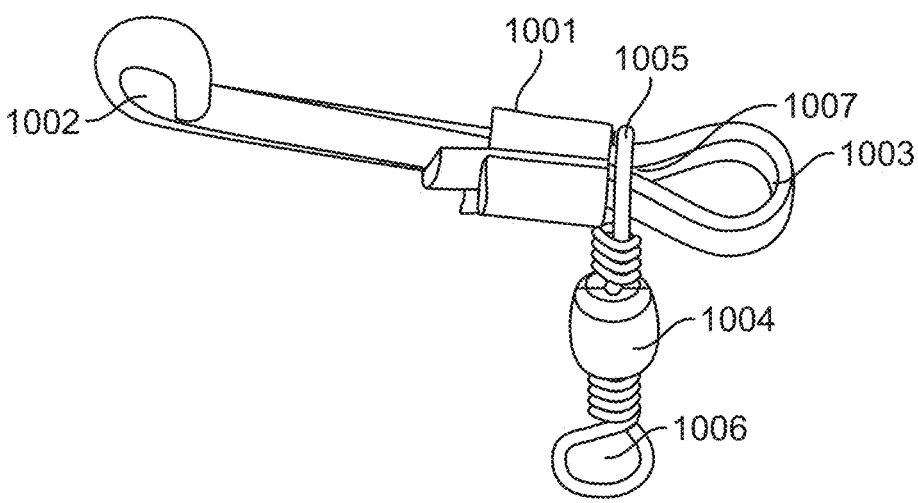
FIG. 10 is a perspective view of a rocker arm pin with an attached release cable attachment according to an embodiment of the present invention.
Figure 12:
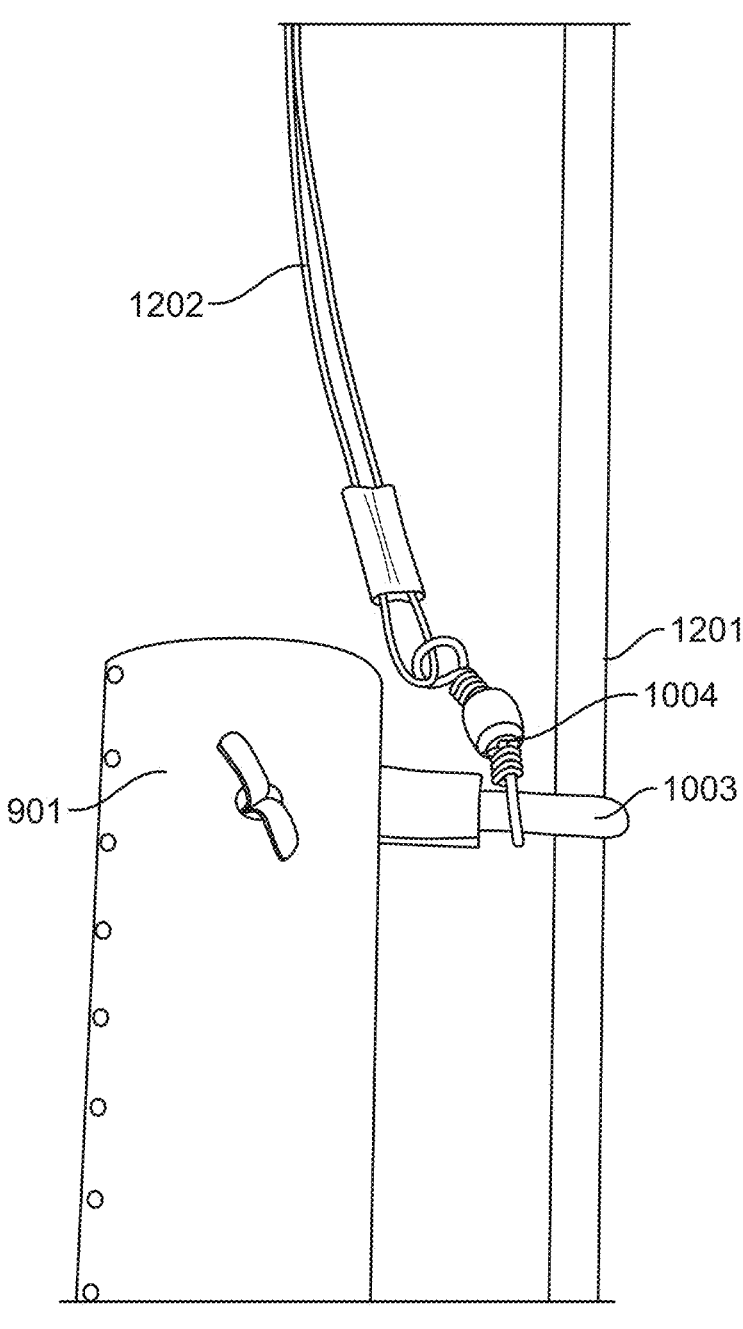
FIG. 12 is a side view of the lock off tube with the attached rocker arm pin in an unlocked position according to an embodiment of the present invention.

In some embodiments, near the second end 903 of the lock off tube a rocker arm pin 1001 is provided, seen individually in FIG. 10. In some embodiments, the rocker arm pin 1001 has a first end with a first closed loop 1002 and an opposite second end with a second closed loop 1003. In some embodiments, the position of the first closed loop 1002 has a ninety degree rotational offset in relation to the position of the second closed loop 1003. In some embodiments, a release cable attachment 1004 is connected to the rocker arm pin 1001. The release cable attachment 1004 has a first end with a first closed loop 1005 and an opposite second end with a second closed loop 1006. In some embodiments, the first closed loop 1005 of the release chain connector fits closely around a throat 1007 of the second closed loop 1003 of the rocker arm pin so that the release chain connector 1004 cannot slide off of the rocker arm pin 1001. In some embodiments, the second closed loop 1006 of the release chain connector connects to a first end of a release cable (1202; FIG. 12). A second and opposite end of the release cable (1202; FIG. 12) is held by the operator and used to unlock the locking feature, which will be described below.

Figure 11:
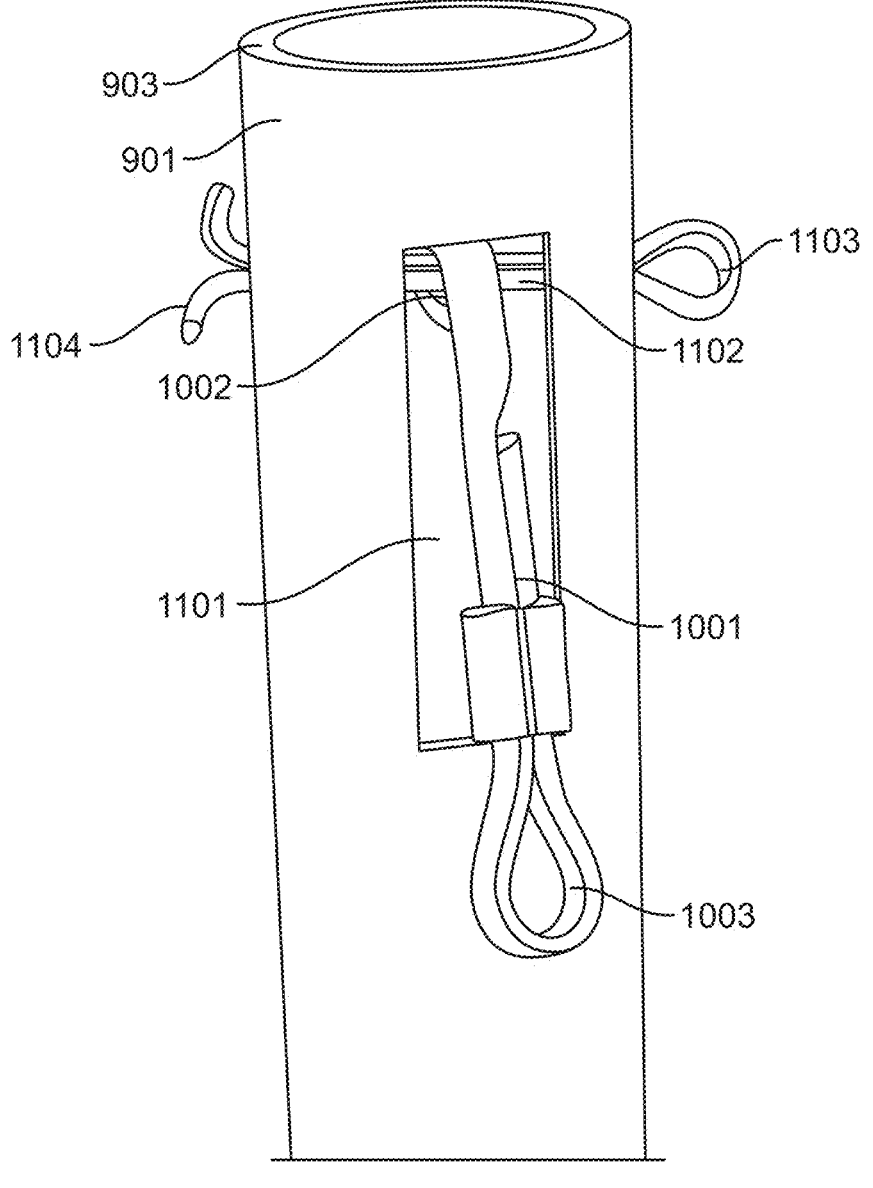
FIG. 11 is a side perspective view of the rocker arm pin held in place by a cotter pin on the lock off tube according to an embodiment of the present invention.

Seen in FIG. 11, in some embodiments, the rocker arm pin 1001 fits through a window 1101 near the second end 903 of the lock off tube. In some embodiments, the window 1101 is rectangular. In some embodiments, the first closed loop 1002 of the rocker arm pin is held in place within the lock off tube 901 with a cotter pin 1102. The cotter pin 1102 is threaded through the first closed loop 1002 of the rocker arm pin. In some embodiments, the cotter pin 1102 is suspended across the inside of the lock off tube 901 through a first hole in the side of the lock off tube and a second hole in the side of the lock off tube. In some embodiments, the first hole and the second hole are on opposite sides from each other of the lock off tube 901 and are located near the top of the window 1101. In some embodiments, the window 1101 is configured to be shaped and sized to prevent the second closed loop 1003 of the rocker arm pin from entering into the lock off tube 901. In some embodiments, the cotter pin 1102 has a first end with a closed loop head 1103 and a second end with legs 1104. The legs 1104 of the cotter pin are moved into a splayed position on the outside of the lock off tube 901 to hold the cotter pin 1102 in place by preventing the feet from passing back through the first hole in the lock off tube 901.

Now referring to FIG. 12, in some embodiments the second closed loop 1003 of the rocker arm pin has a bridge cable 1201 passing through its center. In some embodiments, the diameter of the bridge cable 1201 is slightly smaller than the size of the opening of the second closed loop 1003 of the rocker arm pin. Seen in FIG. 13, in some embodiments the bridge cable 1201 has a first end connected to a short spring 1301 and a second end connected to a long spring 1302. The long spring 1302 has slightly less tension than the short spring 1301. In some embodiments, the shorter stronger tension spring 1301 acts mainly as a safety in the event the longer tension spring 1302 gets overstretched. In some embodiments, the long spring 1302 is connected to an arm cable tube harness 1303 which is connected to the plurality of arms 101 in the same manner as described above for the control cable 102. In some embodiments, the short spring 1301 is connected via a two-sided clip 1304 to a long control cable 1305. In some embodiments, the long control cable 1305 is used by the operator to open and close the plurality of arms 101 as follows: the long control cable 1305 pulls the short spring 1301, which pulls the bridge cable 1201, which pulls the long spring 1302, which pulls the arm cable tube harness 1303 to manipulate the plurality of arms 101.

Figure 14:
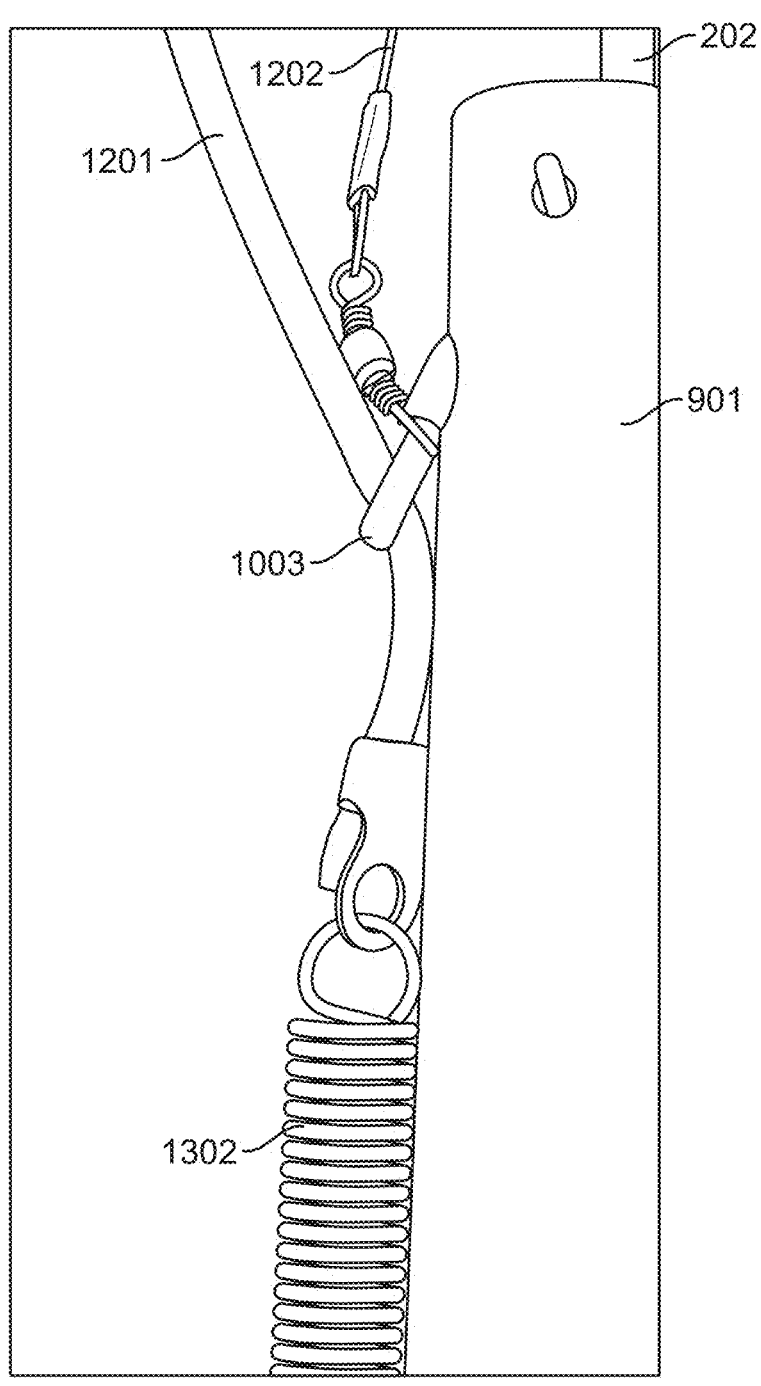
FIG. 14 is a detailed view of the lock off tube with attached rocker arm pin in a locked position according to an embodiment of the present invention.

In some embodiments, the rocker arm pin 1001 in conjunction with the related structures described above, serve as a locking mechanism for the plurality of arms 101. The procedure for using the locking mechanism to lock the plurality of arms 101 around an object (not shown) inside a well or similar structure is as follows. The retrieval device 100 is moved into position with the plurality of arms 101 in an open position surrounding the object. The operator pulls up on the long control cable 1305 which causes the plurality of arms 101 to enter a closed position around the object. In some embodiments, the operator continues to pull on the main pull cable 1305 which will begin to stretch the long spring 1302 once the plurality of arms 101 is in a fully closed position. In some embodiments, the operator releases the long control cable 1305 which causes the long spring 1302 to recoil towards its unstretched position and in doing so the long spring 1302 pulls the bridge cable 1201 in a downwards direction. In some embodiments, as the bridge cable 1201 moves in a downwards direction, it pulls down on the second closed loop 1003 of the rocker arm pin. This moves the rocker arm pin 1001 into an angled position in which the bridge cable 1201 is pinched by the second closed loop 1003 of the rocker arm pin, as seen in FIG. 14. In some embodiments, the bridge cable 1201 is pinched between the second closed loop 1003 of the rocker arm pin and the lock off tube 901. In some embodiments, with the long spring 1302 continuing to exert a downward force on the bridge cable 1201, the rocker arm pin 1001 remains in an angled position and the bridge cable 1201 is held in place which keeps the plurality of arms 101 locked in a closed position.

It is advantageous to be able to unlock the locking feature without having to pull the entire retrieval device out of the well or similar structure. The device may need to be unlocked if, for example, the plurality of arms 101 fails to grab the target object. To unlock the plurality of arms 101, in some embodiments the operator pulls up on the release cable 1202. In some embodiments, the release cable 1202 is attached on one side to a tension spring (not shown) which is then attached to a long release cable (not shown) and the long release cable is manipulated by the operator to unlock the locking feature. In some embodiments, the upward force on the release cable 1202 pulls up on the release cable attachment 1004 which pulls on the throat 1007 of the second closed loop 1003 of the rocker arm pin which in turn pulls the rocker arm pin 1001 back into a straight position (as seen in FIG. 12) in which the rocker arm pin 1001 is oriented orthogonally to the long axis of the lock off tube 901. With the rocker arm pin 1001 in a straight position, the bridge cable 1201 is free to move up and down and the long spring 1302 is free to fully recoil which moves the plurality of arms 101 into an open position, which means the plurality of arms 101 is now unlocked and can be manipulated once again by the operator through use of the long control cable 1305. In some embodiments, the upward force on the bridge cable 1201 by the operator keeps the rocker arm pin 1001 in the unlocked position. In some embodiments, the arms 101 are made of pre-shaped spring steel and return to the open position automatically once the long spring 1302 releases the tension on the arm cable tube harness 1303.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention. For example, any retrieval device version or embodiment, may include any feature, component, etc. described even if not explicitly shown or described. In some embodiments, the present invention may be used to pick up objects in wells or similar structures, as well as reaching high areas to manipulate or retrieve objects such as to change ceiling light bulbs, wherein the device may be attached to a pole, such as a painters pole. The inventive concept of the locking mechanism is intended to be general and may be applicable to other applications beyond the scope of a retrieval device without departing from the spirit of the invention. Other applications for the locking mechanism may include boat riggings, well drilling, cable locking, and the use of any cord or cabling that could benefit from a quick lock and release mechanism as illustrated by the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

What is claimed is:

1. A device for locking a cable to prevent it from sliding, comprising:

a control cable with a first end and a second end, and with a main axis along its length;

a body;

a rocker arm pin having a loop on a first end, the loop configured to receive the control cable through its center, the rocker arm pin with a second end that connects to the body, the first end of the rocker arm pin configured to rotate around the second end of the rocker arm pin on an axis orthogonal to the main axis of the control cable from an unlocked position wherein the plane of the loop is substantially orthogonal to the main axis of the control cable to a locked position wherein the plane of the loop is substantially parallel to the main axis of the control cable;

a first spring having a first spring end connected to the first end of the control cable and a second spring end connected to an object;

the loop on the rocker arm pin configured to remain in the unlocked position when a pull force is applied to the second end of the control cable wherein the second end of the control cable is on an opposite side of the loop on the rocker arm pin from the first end of the control cable and the control cable moves in a backward direction through the loop, and the loop configured to move to the locked position when the pull force is withdrawn and the first spring pulls the control cable in a forward direction through the loop and the loop configured to pinch the control cable against the body in the closed position.

2. The device of claim 1, further comprising a release cable with a first end connected to the rocker arm pin near the first end of the rocker arm pin and the release cable configured to pull the rocker arm pin from the locked position into the unlocked position when a pull force is applied to a second end of the release cable.

3. The device in claim 1, further comprising a second spring attached to the control cable on the opposite side of the loop from the first spring, and the second spring having greater tension than the first spring acting as a safety in case the first spring gets overstretched.

4. The device of claim 1, wherein the body is a retrieval device and the object connected to the second end of the first spring is an arm cable tube harness on the retrieval device that is connected to a plurality of arms on the retrieval device, and the arms are configured to contract around a target object when a pull force is applied to the second end of the control cable.

5. The device of claim 4, wherein the retrieval device is configured to fit inside a narrow passage such as a pipe or well.

6. The device of claim 4, further comprising a camera with a camera lens affixed to the retrieval device using a tube clasp, and the camera lens positioned near the plurality of arms and oriented towards the plurality of arms to provide a visual aid for manipulating the plurality of arms around a target object.

7. The device of claim 4, further comprising gripping features on the plurality of arms configured to enhance the retrieval of a particular target object.

8. The device of claim 4, wherein the plurality of arms is made of pre-shaped spring steel enabling the plurality of arms to repeatedly return to an open position when the tension on the control cable is withdrawn.

9. A retrieval device with locking feature, comprising:

a body;

a plurality of arms attached to a distal end of the body, wherein each arm includes gripping features designed to secure items to be retrieved;

a control cable having a first fixed end and a second free end, wherein the first fixed end is connected to the plurality of arms and the second free end is configured to be pulled by a user to facilitate movement of the arms from an open to a closed position, thereby enabling capture of an item;

a locking mechanism configured to lock the control cable; and, a separate release cable with a free end configured to be grasped and pulled by a hand of a user to unlock the control cable subsequent to the control cable becoming locked.

10. The device of claim 9, wherein the body is configured to lock the control cable when the control cable is pulled a predetermined distance in a predetermined direction.

11. The device of claim 9, wherein the retrieval device is configured and sized to fit inside a narrow passage, wherein the narrow passage is at least one of: a pipe or well.

12. The device of claim 9, further comprising a camera affixed to the body and oriented towards the plurality of arms to provide a visual aid for manipulating the plurality of arms around a target object.

13. The device of claim 9, wherein the plurality of arms is made of pre-shaped spring steel enabling the plurality of arms to repeatedly return to an open position when the tension on the control cable is withdrawn.

* * * * *